US010719805B2

(12) United States Patent
Ferguson et al.

(10) Patent No.: US 10,719,805 B2
(45) Date of Patent: Jul. 21, 2020

(54) AUTONOMOUS ROBOT VEHICLE WITH SECURABLE COMPARTMENTS

(71) Applicant: Nuro, Inc., Mountain View, CA (US)

(72) Inventors: David Ferguson, San Francisco, CA (US); Jiajun Zhu, Palo Alto, CA (US); Pichayut Jirapinyo, San Francisco, CA (US); Nan Ransohoff, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 16/158,982

(22) Filed: Oct. 12, 2018

(65) Prior Publication Data

US 2019/0049995 A1 Feb. 14, 2019

Related U.S. Application Data

(63) Continuation-in-part of application No. PCT/US2018/044361, filed on Jul. 30, 2018.
(Continued)

(51) Int. Cl.
*G05D 1/02* (2006.01)
*G06Q 10/08* (2012.01)
(Continued)

(52) U.S. Cl.
CPC ............ *G06Q 10/0837* (2013.01); *A23L 2/52* (2013.01); *A23L 5/00* (2016.08); *A23L 7/109* (2016.08);
(Continued)

(58) Field of Classification Search
None
See application file for complete search history.

(56) References Cited

U.S. PATENT DOCUMENTS 9,256,852 B1 2/2016 Myllymaki
9,561,941 B1 * 2/2017 Watts ...................... B66F 9/063
(Continued)

OTHER PUBLICATIONS

Notification of Transmittal of the International Search Report and the Written Opinion of the International Search Authority, or the Declaration issued in PCT application No. PCT/US2018/044361 dated Oct. 10, 2018, 12 pages.
(Continued)

*Primary Examiner* — Richard M Camby

(57) ABSTRACT

A system for a mobile secure locker in accordance with aspects of the present disclosure includes processor(s) and memory storing instructions. The instructions, when executed by the processor(s), cause the system to provide a user interface for a user to rent a mobile secure locker in an autonomous robot vehicle, receive information through the user interface from the user where the information includes a first destination, a second destination, and a time associated with the second destination, communicate instructions to the autonomous robot vehicle to travel to the first destination to receive the item, receive an indication from the autonomous robot vehicle that the item has been received, communicate instructions to the autonomous robot vehicle to travel to the second destination to deliver the item to the user at the time associated with the second destination, and receive from the autonomous robot vehicle an indication the item is retrieved.

21 Claims, 10 Drawing Sheets

Related U.S. Application Data

(60) Provisional application No. 62/538,538, filed on Jul. 28, 2017.

(51) Int. Cl.

| | |
|---|---|
| *A23L 2/52* | (2006.01) |
| *A23L 5/00* | (2016.01) |
| *A23L 7/109* | (2016.01) |
| *A47J 37/06* | (2006.01) |
| *B60H 1/00* | (2006.01) |
| *B60P 1/36* | (2006.01) |
| *B60P 3/00* | (2006.01) |
| *B60P 3/025* | (2006.01) |
| *B60R 19/18* | (2006.01) |
| *B60R 19/48* | (2006.01) |
| *B60R 21/34* | (2011.01) |
| *B60R 21/36* | (2011.01) |
| *B60R 25/25* | (2013.01) |
| *B65G 67/24* | (2006.01) |
| *G01C 21/20* | (2006.01) |
| *G01C 21/34* | (2006.01) |
| *G05D 1/00* | (2006.01) |
| *G05D 1/12* | (2006.01) |
| *G06F 16/955* | (2019.01) |
| *G06K 7/10* | (2006.01) |
| *G06K 7/14* | (2006.01) |
| *G06K 9/00* | (2006.01) |
| *G06K 19/06* | (2006.01) |
| *G06K 19/07* | (2006.01) |
| *G06N 20/00* | (2019.01) |
| *G06Q 10/06* | (2012.01) |
| *G06Q 20/00* | (2012.01) |
| *G06Q 20/12* | (2012.01) |
| *G06Q 20/18* | (2012.01) |
| *G06Q 30/02* | (2012.01) |
| *G06Q 30/06* | (2012.01) |
| *G06Q 50/12* | (2012.01) |
| *G06Q 50/28* | (2012.01) |
| *G06Q 50/30* | (2012.01) |
| *G07F 17/00* | (2006.01) |
| *G07F 17/12* | (2006.01) |
| *G08G 1/04* | (2006.01) |
| *G08G 1/00* | (2006.01) |
| *H04L 29/08* | (2006.01) |
| *H04W 4/024* | (2018.01) |
| *H04W 4/40* | (2018.01) |
| *H05B 6/68* | (2006.01) |
| *G06F 3/0484* | (2013.01) |
| *H04N 5/76* | (2006.01) |

(52) U.S. Cl.
CPC ...... *A47J 37/0658* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 21/36* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0631* (2013.01); *G06Q 30/0645* (2013.01); *G06Q 50/12* (2013.01); *G06Q 50/28* (2013.01); *G06Q 50/30* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *H05B 6/688* (2013.01); *A23V 2002/00* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01)

(56) References Cited

U.S. PATENT DOCUMENTS

| | | |
|---|---|---|
| 2010/0084426 A1 | 4/2010 | Devers et al. |
| 2014/0081445 A1 | 3/2014 | Villamar |
| 2015/0006005 A1 | 1/2015 | Yu et al. |
| 2015/0317596 A1* | 11/2015 | Hejazi ............... G06Q 50/28 705/330 |
| 2015/0323932 A1* | 11/2015 | Paduano ............ G05D 1/042 701/3 |
| 2017/0110017 A1 | 4/2017 | Kimchi et al. |
| 2017/0174343 A1 | 6/2017 | Erickson et al. |
| 2018/0082343 A1* | 3/2018 | Gordon ............. G06Q 30/0279 |
| 2018/0144300 A1 | 5/2018 | Wiechers |
| 2018/0144302 A1 | 5/2018 | Murray et al. |
| 2018/0232839 A1* | 8/2018 | Heinla ............ G05B 19/41895 |
| 2018/0246526 A1* | 8/2018 | Wilkinson ........... G05D 1/0291 |
| 2018/0311820 A1* | 11/2018 | Fritz ................ G05D 1/0274 |
| 2018/0330313 A1* | 11/2018 | Clarke ................ B60P 3/007 |

OTHER PUBLICATIONS

Int'l Search Report and Written Opinion completed Oct. 1, 2019 corresponding to counterpart Int'l Patent Application PCT/US2019/43887.

\* cited by examiner

AUTONOMOUS ROBOT VEHICLE WITH SECURABLE COMPARTMENTS

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to autonomous vehicles, and in particular, to autonomous robot vehicles with securable compartments.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications. Autonomous vehicles also show promise.

Tourists or travelers who travel to different destinations far away from home have limited options for storing their items and later retrieving them. Often they do not have a convenient place to store items when on travel. Tourists or travelers may use fixed storage locations, such as train station lockers or hotel services. However, fixed storage locations are inconvenient and inefficient. Other situations involving fixed storage locations face similar concerns. Accordingly, there is interest in developing technologies for addressing concerns with existing storage solutions.

SUMMARY

This disclosure relates to a fully-autonomous and/or semi-autonomous robot fleet and, in particular, to a fleet of robot vehicles for transporting or retrieving items in either unstructured outdoor environment or closed environments.

In accordance with aspects of the present disclosure, a system for a mobile secure locker includes one or more processors; and a memory storing instructions. The instructions, when executed by the processor(s), cause the system to: provide a user interface for a user to rent a mobile secure locker in an autonomous robot vehicle, receive information through the user interface from the user where the information includes a first destination, a second destination, and a time associated with the second destination, communicate instructions to the autonomous robot vehicle to travel to the first destination to receive an item, receive an indication from the autonomous robot vehicle that the item has been received, communicate instructions to the autonomous robot vehicle to travel to the second destination to deliver the item at the time associated with the second destination, and receive from the autonomous robot vehicle an indication that the item has been retrieved.

In accordance with aspects of the present disclosure, the instructions, when executed by the processor(s), further cause the system to: provide the user interface for the user to enter additional information for retrieving the item from the autonomous robot vehicle, receive the additional information from the user interface where the additional information includes a current location of the user, modify the second destination to the current location of the user, and communicate instructions to the autonomous robot vehicle to travel to the current location of the user to deliver the item to the user.

In an aspect of the present disclosure, the instructions, when executed by the processor(s), further cause the system to: provide the user interface for the user to enter additional information for retrieving the item from the autonomous robot vehicle, receive the additional information from the user interface, the additional information including at least one of a new second destination or a new time associated with the second destination, modify at least one of: the second destination to the new second destination or the time associated with the second destination current location of the user to the new time associated with the second destination current location of the user, and communicate instructions to the autonomous robot vehicle to travel at least one of: to the new second destination or at the new time to deliver the item to the user.

In an aspect of the present disclosure, the mobile secure locker is configured to unlock based on biometric data corresponding to the user.

In another aspect of the present disclosure, the instructions, when executed by the processor(s), further cause the system to: provide a user interface to enter information identifying the user, and receive user-identifying information through the user interface from the user.

In an aspect of the present disclosure, the user-identifying information includes at least one of a PIN, RFID, voice, facial recognition, or a predetermined code on a mobile device.

In yet another aspect of the present disclosure, the instructions, when executed by the processor(s), further cause the system to receive an indication from the autonomous robot vehicle confirming the identity of the user at the second location, wherein the confirming is performed based on the user-identifying information.

In a further aspect of the present disclosure, the instructions, when executed by the one or more processors, further cause the system to receive a video from the autonomous robot vehicle, with the video recording the user placing the item in the autonomous robot vehicle.

In an aspect of the present disclosure, the instructions, when executed by the processor(s), further cause the system to store the video in the at least one memory.

In a further aspect of the present disclosure, in providing the user interface, the instructions, when executed by the processor(s), cause the system to provide the user interface to a device of the user.

In yet another aspect of the present disclosure, in providing the user interface, the instructions, when executed by the processor(s), cause the system to provide the user interface to a display screen of the autonomous vehicle.

In accordance with aspects of the present disclosure, a computer-implemented method for a mobile secure locker is disclosed. The computer-implemented method includes providing a user interface for a user to rent a mobile secure locker in an autonomous robot vehicle, receiving information through the user interface from the user where the information includes a first destination, a second destination, and a time associated with the second destination, communicating instructions to the autonomous robot vehicle to travel to the first destination to receive an item, receiving an indication from the autonomous robot vehicle that the item has been received, communicating instructions to the autonomous robot vehicle to travel to the second destination to deliver the item at the time associated with the second destination, and receiving from the autonomous robot vehicle an indication that the item has been retrieved.

In an aspect of the present disclosure, the computer-implemented method further includes receiving a video from the autonomous robot vehicle, with the video recording including the retrieving of the item.

In another aspect of the present disclosure, the computer-implemented method further includes storing the video.

In a further aspect of the present disclosure, the computer-implemented method further includes unlocking the mobile secure locker based on biometric data corresponding to the user.

In yet a further aspect of the present disclosure, the computer-implemented method further includes providing a user interface to enter information identifying the user, and receiving user-identifying information through the user interface from the user.

In yet another aspect of the present disclosure, the computer-implemented method further includes providing the user interface for the user to enter additional information for retrieving the item from the autonomous robot vehicle, receiving the additional information from the user interface where the additional information includes a current location of the user, modifying the second destination to the current location of the user, and communicating instructions to the autonomous robot vehicle to travel to the current location of the user to deliver the item to the user.

In a further aspect of the present disclosure, the indication identifying the user includes at least one of a PIN, RFID, voice, facial recognition, or a predetermined code on a mobile device.

In an aspect of the present disclosure, the computer-implemented method further includes receiving an indication from the autonomous robot vehicle confirming the identity of the user at the second location, where the confirming is performed based on the user-identifying information.

In a further aspect of the present disclosure, the method further includes providing the user interface to a device of the user.

In yet a further aspect of the present disclosure, the method further includes providing the user interface to a display screen of the autonomous vehicle.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
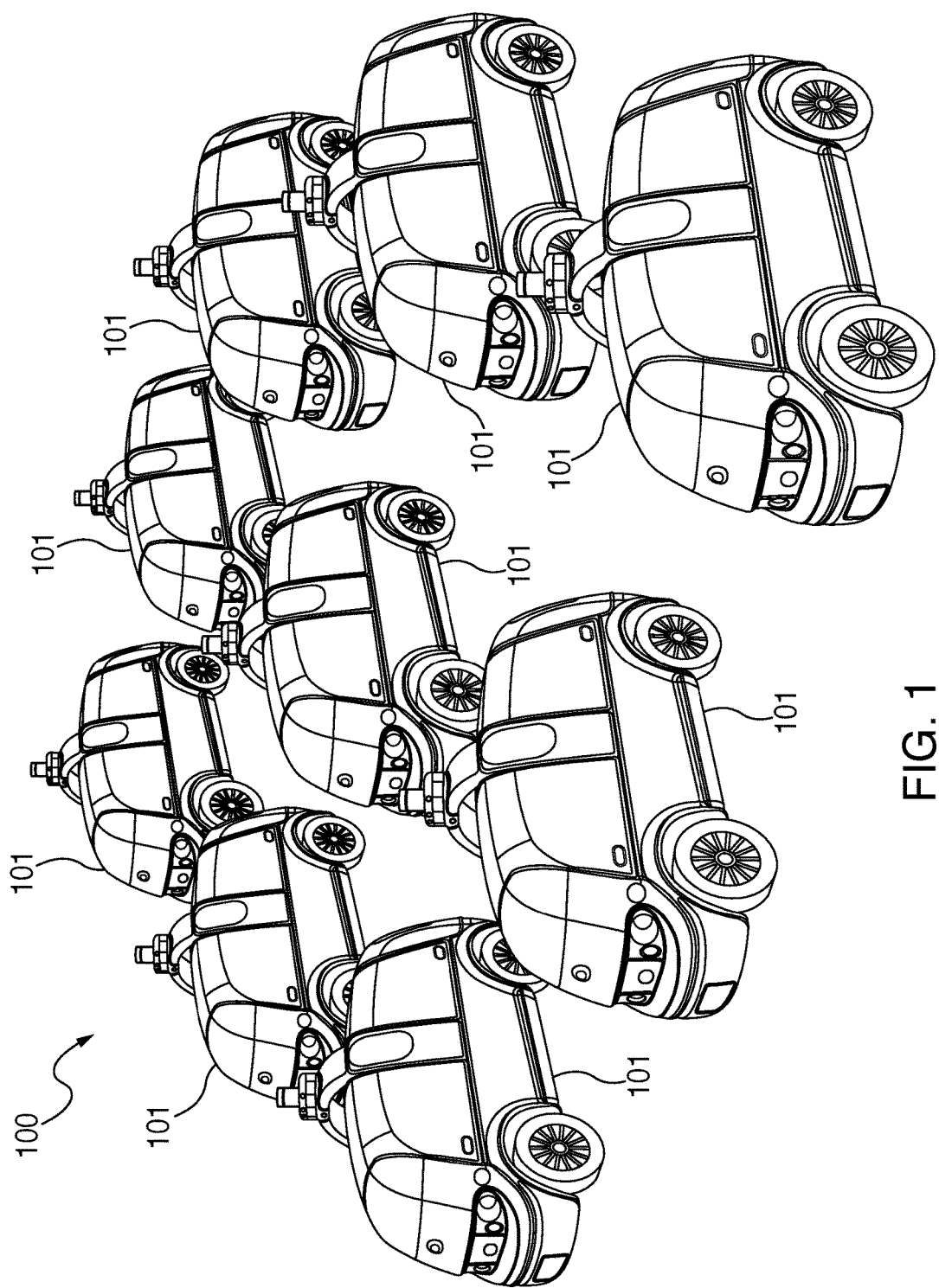
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can travel or operate in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. The term "sub-compartment" is generally used to indicate a subdivision or portion of a compartment. When used in the context of a compartment or sub-compartment, the term "module" may be used to indicate one or more compartments or sub-compartments.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smart-phones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over-water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-*a*, 100-*b*).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
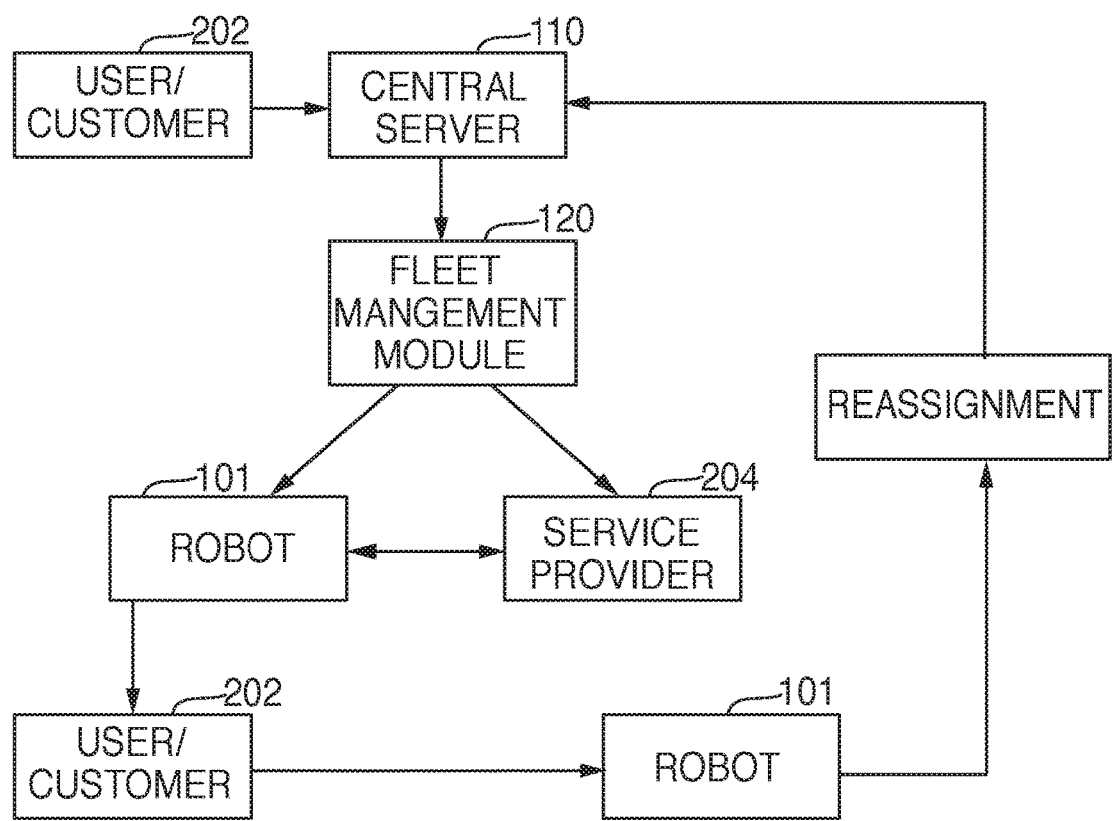
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
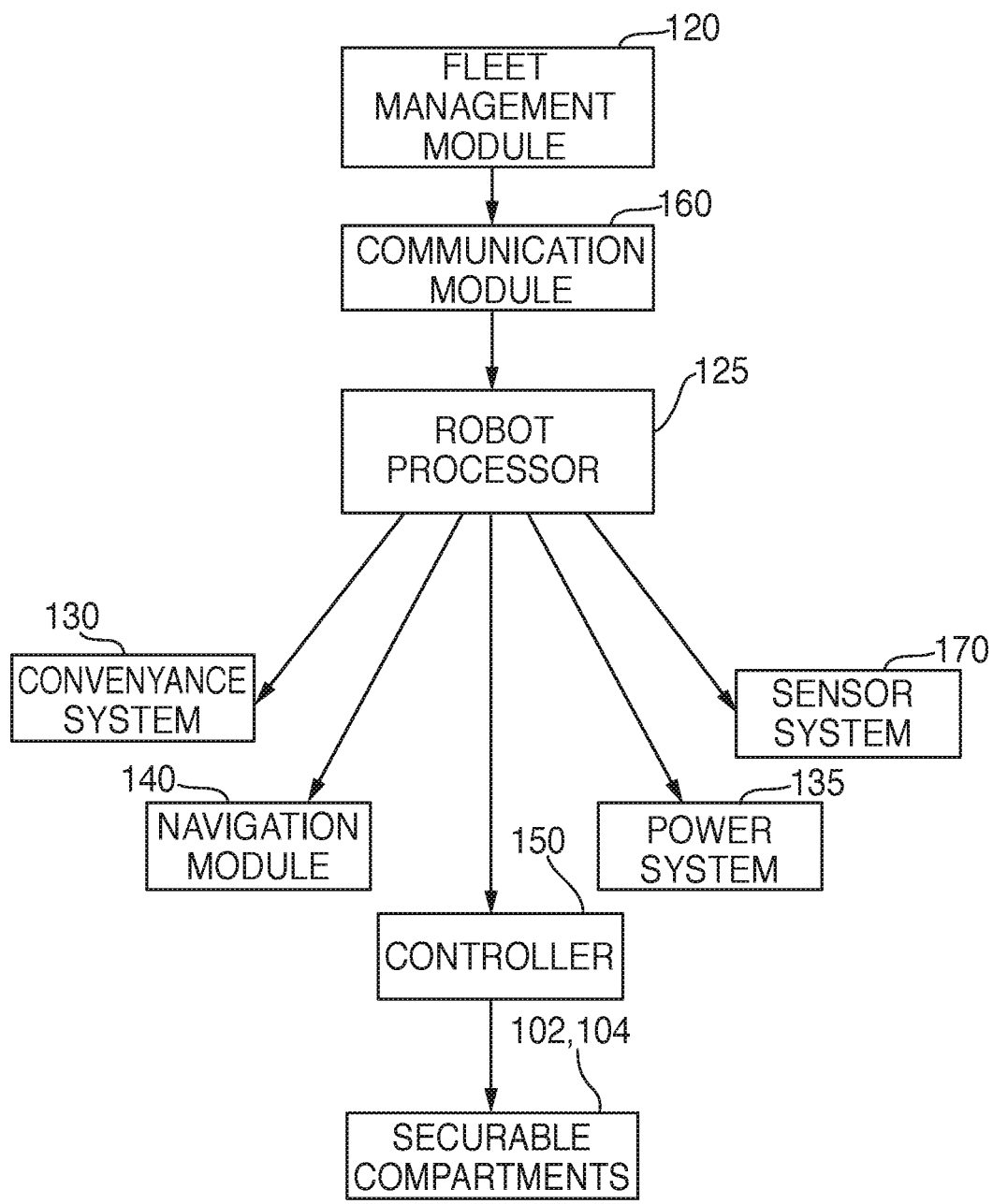
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
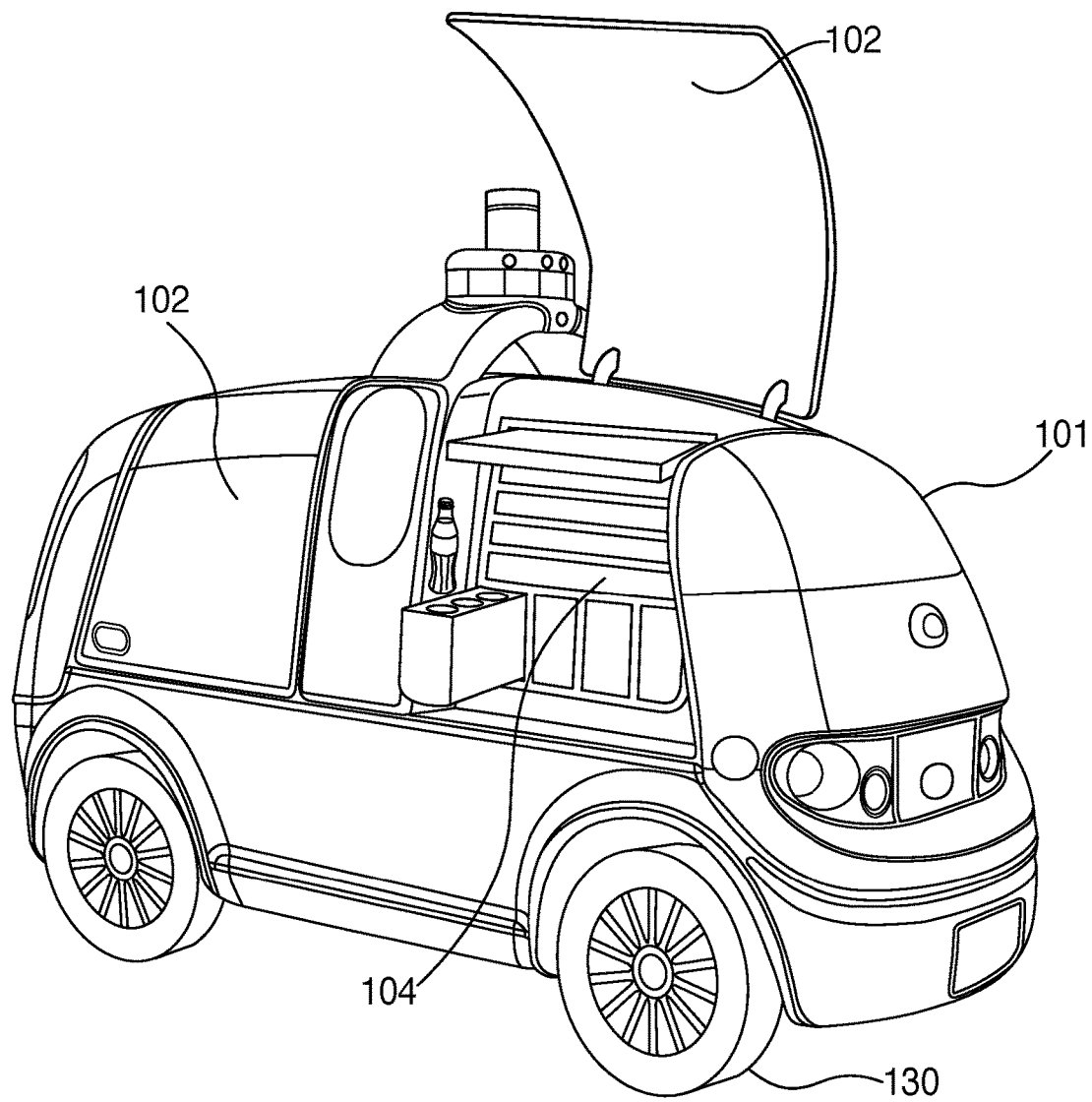
FIG. 2 is an exemplary ISO view of a robot vehicle, part of an autonomous robot fleet, illustrating securable compartments within the vehicle.
Figure 3:
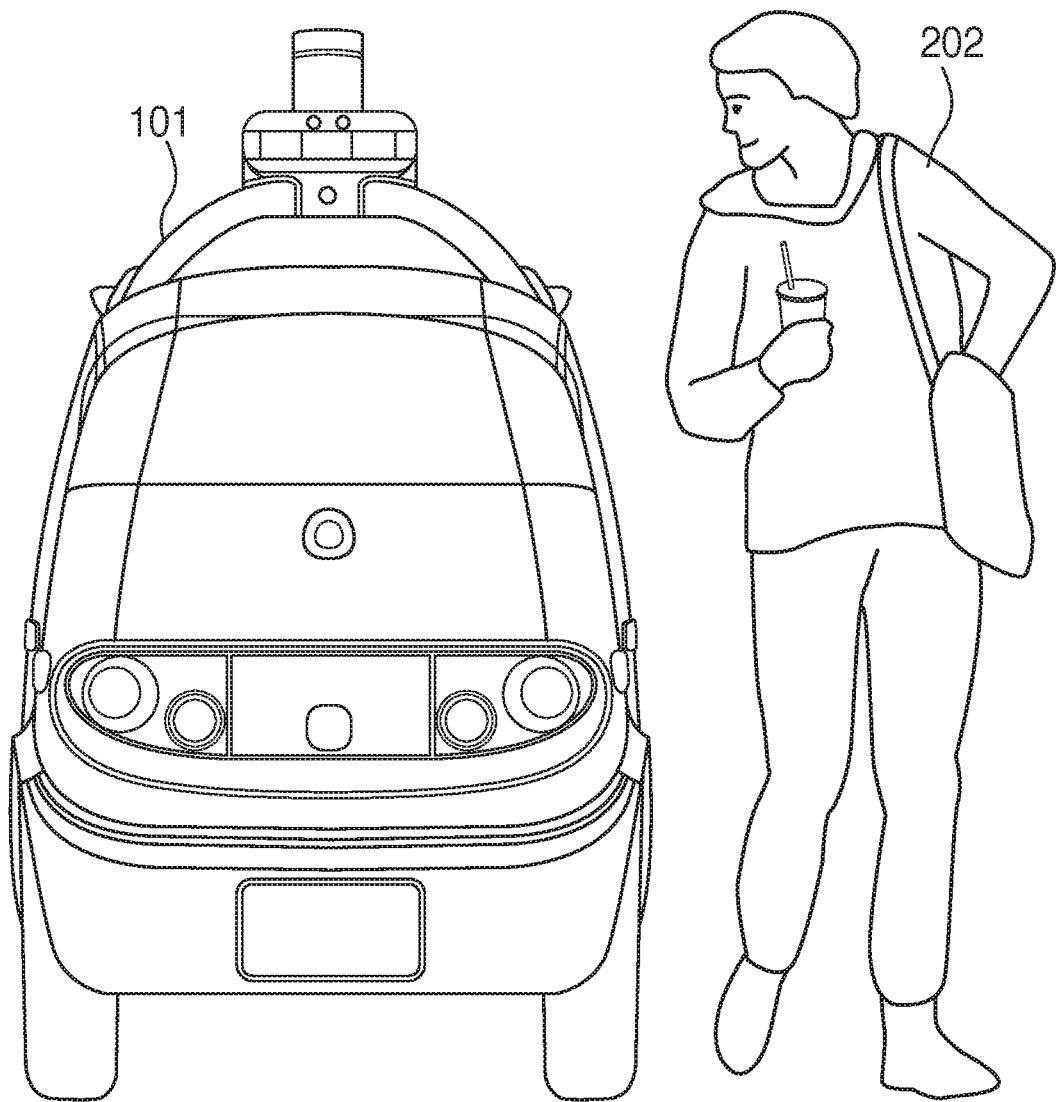
FIG. 3 is an exemplary front view of a robot vehicle, part of an autonomous robot fleet, shown in comparison to the height of an average person.
Figure 4:
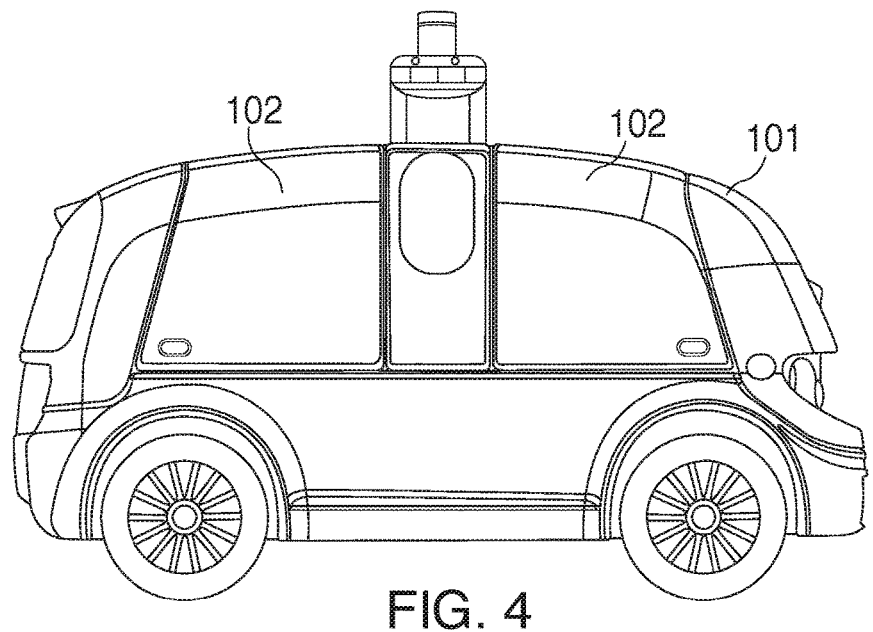
FIG. 4 is an exemplary right side view of a robot vehicle, part of an autonomous robot fleet, illustrating a configuration with two large side doors, each enclosing securable compartments.
Figure 5:
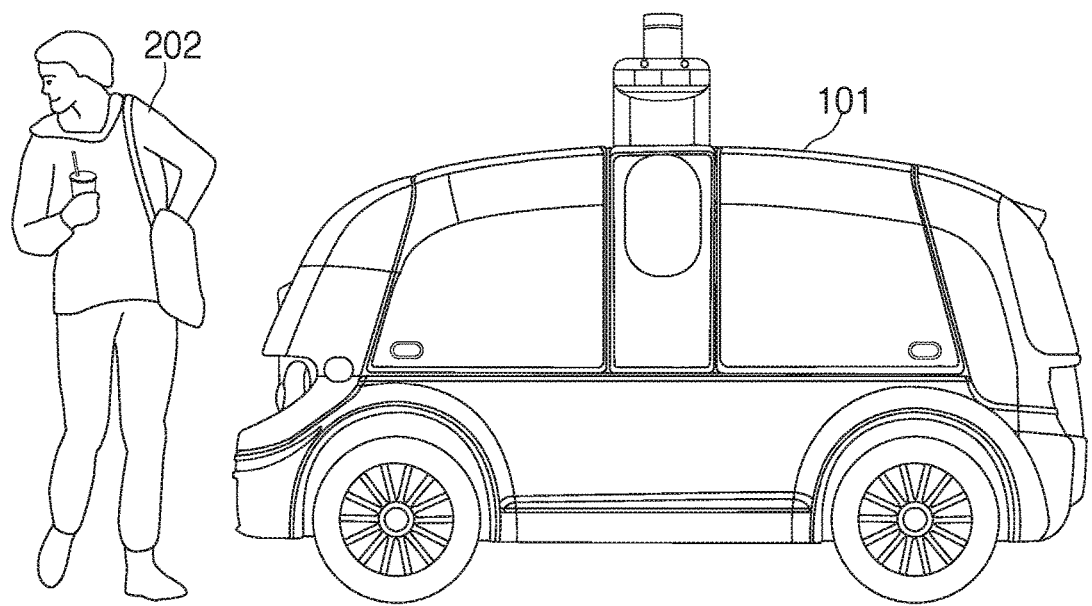
FIG. 5 is an exemplary left side view of a robot vehicle, part of an autonomous robot fleet, shown in comparison to the height of an average person.
Figure 6:
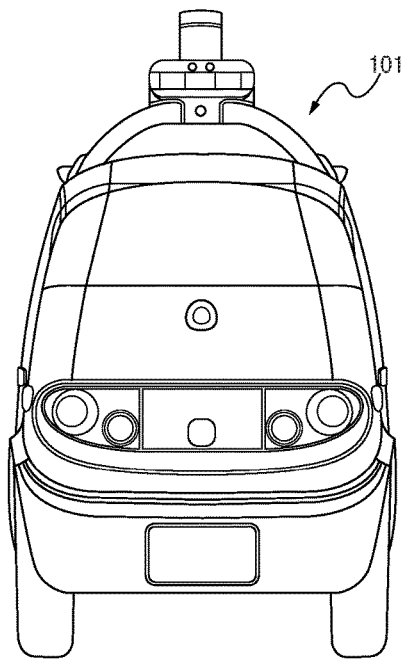
FIG. 6 is an exemplary rear view of a robot vehicle, part of an autonomous robot fleet.
Figure 7:
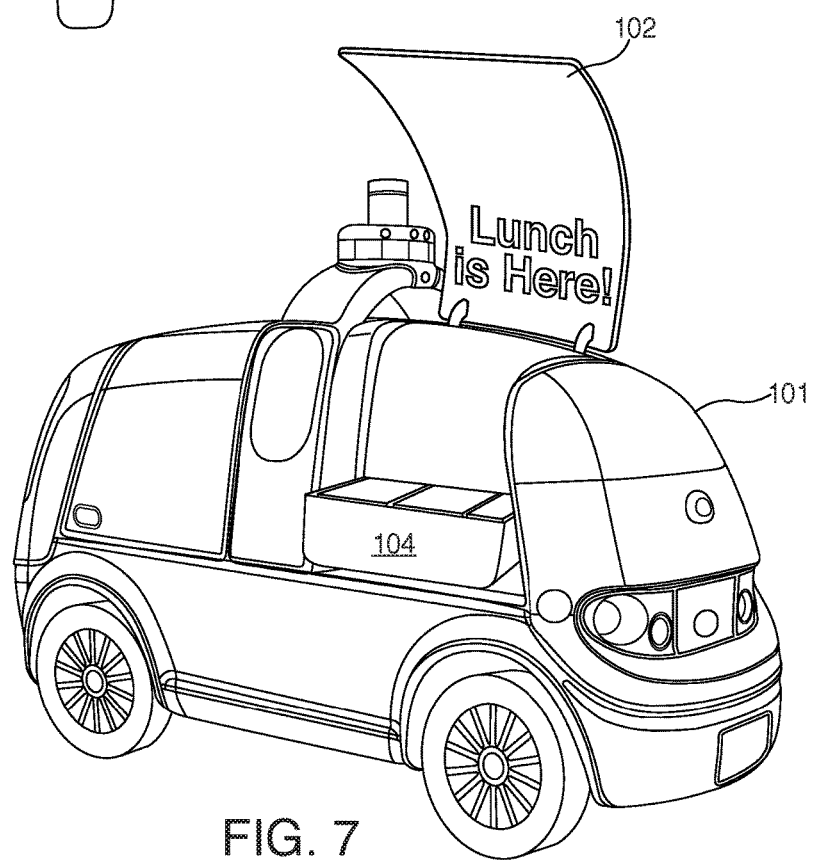
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
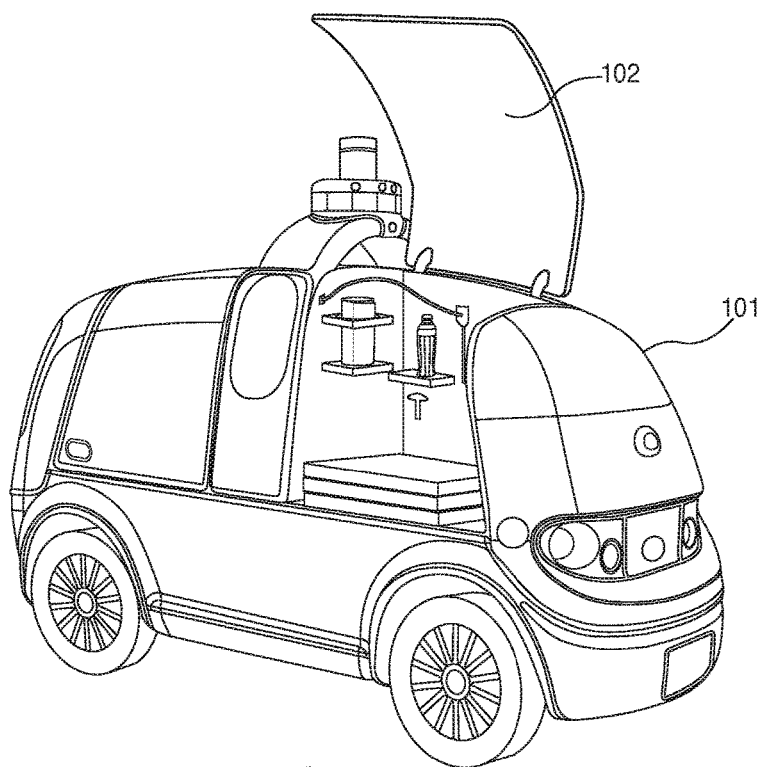
FIG. 8 is an exemplary ISO view of a robot vehicle, part of an autonomous robot fleet, illustrating an autonomous pizza delivery vehicle for any branded company.
Figure 9:
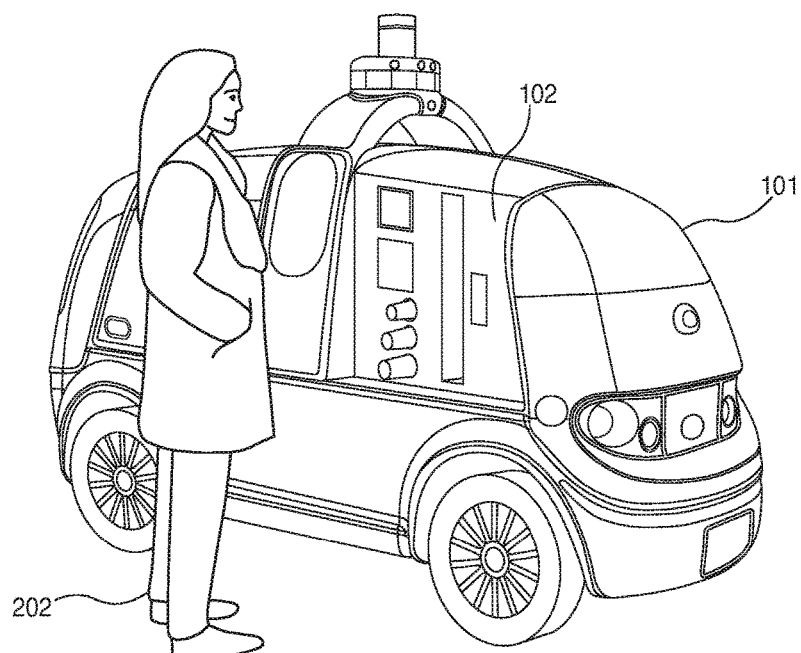
FIG. 9 is an exemplary ISO view of a robot vehicle, part of an autonomous robot fleet, illustrating an autonomous coffee delivery vehicle for any branded company.
Figure 10:
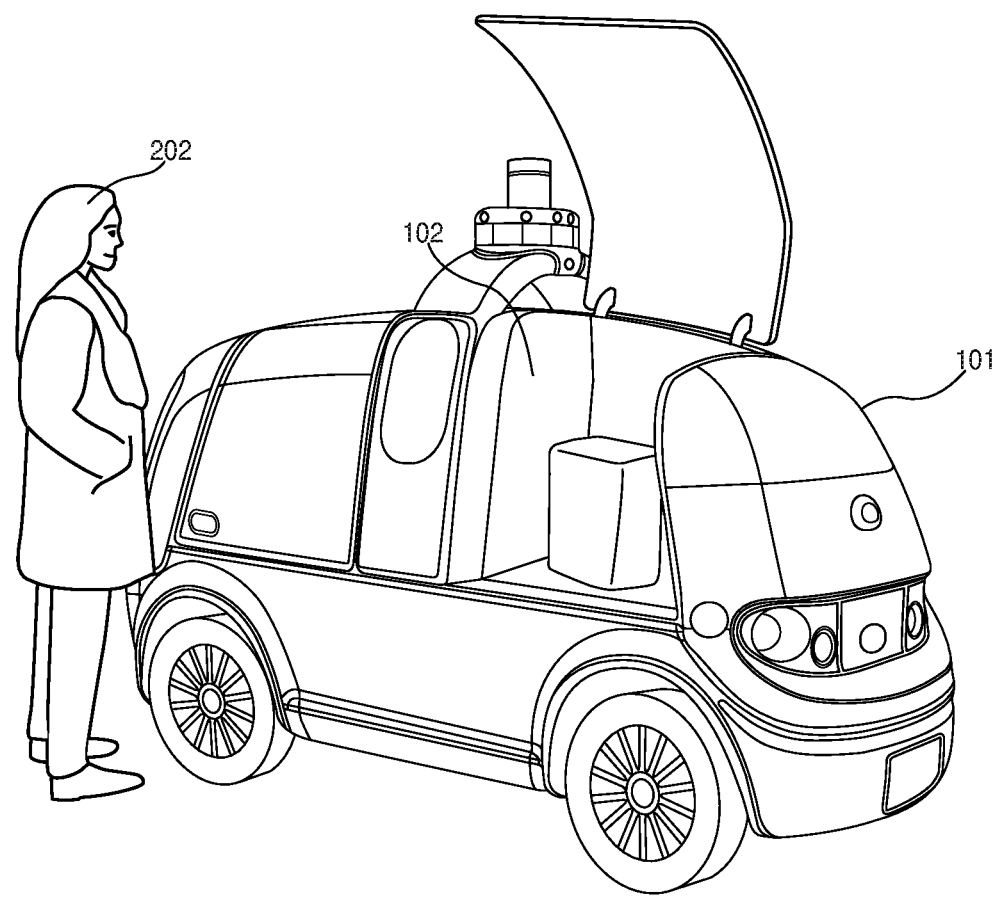
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized. Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone)

Figure 13:
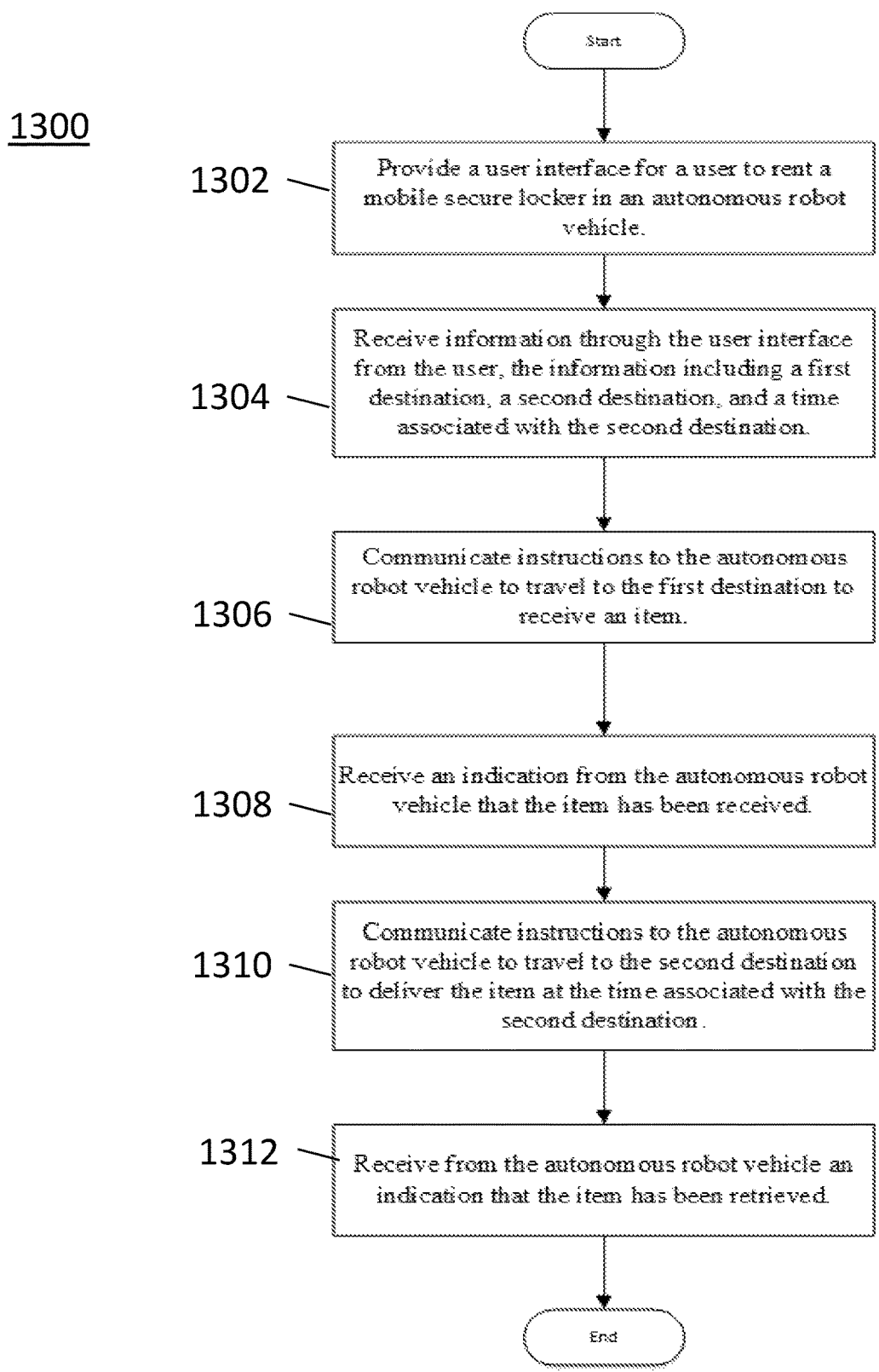
FIG. 13 is an exemplary flowchart representation illustrative of a method for providing a mobile secure locker.

Referring now to FIG. 13, there is shown a flow diagram of a method 1300 of operating a mobile secure locker system. Persons skilled in the art will appreciate that one or more operations of the illustrated method 1300 may be performed in a different order, repeated, and/or omitted without departing from the scope of the present disclosure. In various embodiments, the illustrated method 1300 can operate in the central server 110 of FIG. 11, in the fleet management module 120, or in another server or system. In various embodiments, some or all of the operations in the illustrated method 1300 can operate in the robot vehicle 101, such as using the components of FIG. 12. Other variations are contemplated to be within the scope of the present disclosure.

Initially at step 1302, the system for a mobile secure locker provides a user interface for a user to rent a mobile secure locker in an autonomous robot vehicle 101. For example, this interface may be provided to the user on an app on a mobile device, a web app, a web browser, at a kiosk, or on a display screen of an autonomous vehicle. In various embodiments, the autonomous robot vehicle 101 may be configured to communicate with the device of the user. In various embodiments, the user interface may be displayed on a mobile device, or on a display on the autonomous robot vehicle 101. The display may be touch screen.

At step 1304, the system receives information through the user interface from the user, including information on a first destination, a second destination, and a time associated with the second destination. For example, the first destination may be a current location of the user, and the second destination may be a location where the user expects to be in the future. The time associated with the second location can be the future time when the user expects to be at the second location. The user can provide this information through the user interface (not shown), which can include fields for entering such information. In various embodiments, the first location and the second location can be specified by addresses. In various embodiments, the first location and the second location can be specified by map coordinates, which can be provided by a user selecting a particular location on a map.

At step 1306, the system communicates instructions to the autonomous robot vehicle 101 to travel to the first destination to receive the item from the user. Aspects of the autonomous robot vehicle are described above herein, including securable compartments and secure user access to compartments. Accordingly, a user can store items in a compartment 102, 104 of the robot vehicle 101. In various embodiments, the robot vehicle 101 can receive the item in a sub-compartment. The descriptions herein relating to a compartment apply to a sub-compartment as well. In various embodiments, the robot vehicle 101 can determine which compartment or sub-compartment to assign to a particular user based on the user's description of the item, which may include dimension information and weight information.

At step 1308, the system receives an indication from the autonomous robot vehicle 101 that the item has been received. In various embodiments, the robot vehicle 101 may include an authentication system that communicates with the server to detect user-identifying data corresponding to a user. In various embodiments, the robot vehicle 101 stores the user's locations as well as other data points that would help identify the user, which for example, may include names, birthdays, PIN numbers, phone numbers, user accounts, and biometric information such as facial recognition or fingerprints. The robot vehicle 101 may use any combination of these to identify the user and allows only a verified user to access the vehicles' compartments 102, 104. In various embodiments, the user may use a smartphone app with their account logged in to access the robot vehicle 101. In various embodiments, the user receives a PIN code via a text message from the robot vehicle 101 that can be used to open the robot vehicle 101. In various embodiments, the system may use facial recognition or other biometric information to identify the user before permitting access to content inside the robot vehicle's 101 compartments 102, 104. Such examples are merely illustrative, and other verification or identification mechanisms are contemplated to be within the scope of the present disclosure.

At step 1310, the system communicates instructions to the autonomous robot vehicle 101 to travel to the second destination to deliver the item at the time associated with the second destination. This destination, for example, could be a residential address, a commercial address, or a GPS location. For example, the user could be located at the beach or a camp site. The time associated with the second location may be set by the user in advance, as a time when the user expects to be at the second location. In various embodiments, if the user reaches a particular GPS location that matches the second destination, the system may instruct the autonomous robot vehicle 101 to travel to the second destination as soon as possible, and can send a message to the user interface that the autonomous robot vehicle 101 is en route to deliver the item. In various embodiments, a user may be able to update the 2nd destination/pick-up time via the user interface. For example, if travelers loaded up luggage in the secure lockers of the autonomous robot vehicle 101 and their flights got delayed, the traveler may want to adjust the time that they want the autonomous robot vehicle 101 to meet them at the airport. The traveler may then use the user interface to update the time and the system would have the autonomous robot vehicle 101 meet the traveler at the later time.

In various embodiments, the autonomous robot vehicle 101 determines a travel route that includes arriving at the second destination at or before the time associated with the second destination. The route may include multiple destinations. Thus, the autonomous robot vehicle may make one or more stops before arriving at the second destination. The navigation system of the autonomous vehicle may determine a route that achieves multiple deliveries in a minimum amount of time or gas.

In various embodiments, the robot vehicle 101 includes an authentication system that communicates with a server to detect data corresponding to an intended recipient of an item within the securable compartment 102, 104, such as the user or another intended recipient. It is contemplated that the recipient could be the user who stored the item in the compartment 102, 104, or another intended recipient. For example, the user who stores an item in the autonomous robot vehicle and the user who retrieves the item from the autonomous robot vehicle may be members of the same family, the same company, or the same travel group, or may have another relationship. In various embodiments, the user who stores an item in the autonomous robot vehicle maybe a seller, and the user who retrieves the item from the autonomous robot vehicle may be a buyer. The authentication system communicates with the server to authenticate an intended recipient or user of the securable compartment 102, 104.

In various embodiments, the large compartment 102 may be securable. The large compartment 102 may be configured to provide access to multiple spaces or sub-compartments 104. The multiple spaces or sub-compartments 104 may each be securable. The user-verifying data may include any of the above approaches, and/or may include, for example, biometric data, RFID data, barcode data, QR code data, magnetic stripe data, optical character recognition data, and image scanner data. In various embodiments, a mobile device or other electronic device may be used to communicate with the autonomous robot vehicle. For example, the secured compartment 102, 104 may be reserved using a mobile device. The mobile device may then be used to unlock the secured compartment 102, 104 by any of the above methods or by near field communications, or by other wireless communications protocols such as Wi-Fi® or Bluetooth®.

In various embodiments, the server may unlock a securable module or secured compartment 102, 104 of the autonomous robot vehicle 101 based on biometric data corresponding to the user. In various embodiments, the system may receive a video from the autonomous robot vehicle 101, with the video recording the user retrieving the item from the autonomous robot vehicle 101. The system may store the video in memory.

In various embodiments, the autonomous robot vehicle 101 may communicate with the wireless device. For example, the mobile device may be a smartphone, a personal mobile device, a personal digital assistant (PDA), a computer, a wearable computing device, or combinations of such devices. In various embodiments, if a user is experiencing trouble accessing the securable compartment 102, 104, a video camera or voice system on the robot 101 may be used to communicate with a teleoperator. For example, if an intended recipient or user of the securable compartment is unable to unlock the compartment, they may communicate with the teleoperator for assistance. The teleoperator may for example, open the secured compartment 102, 104 remotely using the robot vehicle's 101 communication system. It is contemplated that a teleoperator may monitor and/or assist multiple robots 101 in a fleet. In another embodiment, the robot 101 may include a digital display and an input interface. For example, the input interface may be a keyboard, a touchscreen, or speech recognition.

In various embodiments, the securable compartment 102, 104 can include an alarm indicator, which can provide an alert upon detecting tampering or unauthorized access. For example, the alarm indicator may provide a visual alert, such as lights or a display screen providing a warning or alert, and/or it may provide an audio alert, such as a siren. A sensor may be used to detect any tampering of the secure compartment 102, 104. For example the sensors may be optical, mechanical, or electrical. In various embodiments, the robot 101 stores a seal status and alerts the server if a seal status indicates that a securable compartment 102, 104 has been tampered with.

Finally, at step 1312 the system receives from the autonomous robot vehicle an indication that the item has been retrieved. The illustrated operation of FIG. 13 is exemplary, and other variations of operating a mobile locker rental system on an autonomous vehicle are contemplated. For example, in various embodiments, a user may store an item in a mobile locker system without specifying a second destination. Rather, the user can summon the autonomous vehicle at any time, and the vehicle can travel to a GPS location indicated by the user's device. In various embodiments, the user can indicate multiple destinations and times associated with each destination. In various embodiments, the multiple destinations may be located in the same city, town, or locality. In various embodiments, the multiple destinations may be located in different cities or towns or localities. It is contemplated that the embodiments disclosed herein may be combined in various ways, and such combinations are within the scope of the present disclosure.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for a mobile secure locker, the system comprising:
one or more processors; and
at least one memory storing instructions which, when executed by the one or more processors, cause the system to:
provide a user interface for a user to rent the mobile secure locker in an autonomous robot vehicle;
receive information through the user interface from the user, the information including a first destination, a second destination, and a time associated with the second destination;
communicate instructions to the autonomous robot vehicle to travel to the first destination to receive an item from the user;
receive an indication from the autonomous robot vehicle that the item has been received by the autonomous robot vehicle from the user;
communicate instructions to the autonomous robot vehicle to travel to the second destination to deliver the item at the time associated with the second destination;
provide the user interface for the user to enter additional information for retrieving the item from the autonomous robot vehicle, the additional information including a current location of the user, wherein the user interface includes a map that has a user-selectable display of the current location of the user;
modify the second destination to the current location of the user;
communicate instructions to the autonomous robot vehicle to travel to the current location of the user to deliver the item to the user;
receive from the autonomous robot vehicle an indication that the item has been retrieved; and
receive a video from the autonomous robot vehicle, the video recording the user placing the item in the autonomous robot vehicle.

2. The system of claim 1, wherein the instructions, when executed by the one or more processors, further cause the system to:
receive the additional information from the user interface.

3. A system for a mobile secure locker, the system comprising:
one or more processors; and
at least one memory storing instructions which, when executed by the one or more processors, cause the system to:
provide a user interface for a user to rent the mobile secure locker in an autonomous robot vehicle;
receive information through the user interface from the user, the information including a first destination, a second destination, and a time associated with the second destination;
communicate instructions to the autonomous robot vehicle to travel to the first destination to receive an item from the user;
receive an indication from the autonomous robot vehicle that the item has been received by the autonomous robot vehicle from the user;
communicate instructions to the autonomous robot vehicle to travel to the second destination to deliver the item at the time associated with the second destination;
provide the user interface for the user to enter additional information for retrieving the item from the autonomous robot vehicle, the additional information including a new second destination, wherein the user interface includes a map that has a user-selectable display of the new second destination;
receive the additional information from the user interface, the additional information including at least one of the new second destination or a new time associated with the second destination;
modify at least one of: the second destination to the new second destination or the time associated with the second destination to the new time;
communicate instructions to the autonomous robot vehicle to travel at least one of: to the new second destination or at the new time to deliver the item to the user; and
receive from the autonomous robot vehicle an indication that the item has been retrieved.

4. The system of claim 1, wherein the mobile secure locker is configured to unlock based on biometric data corresponding to the user.

5. The system of claim 1, wherein the instructions, when executed by the one or more processors, further cause the system to:
provide the user interface to enter user-identifying information identifying the user; and
receive the user-identifying information through the user interface from the user.

6. The system of claim 5, wherein the user-identifying information includes at least one of a PIN, RFID, voice, facial recognition, or a predetermined code on a mobile device.

7. The system of claim 5, wherein the instructions, when executed by the one or more processors, further cause the system to receive an indication from the autonomous robot vehicle confirming an identity of the user at the current location of the user, wherein the confirming is performed based on the user-identifying information.

8. The system of claim 1, wherein the instructions, when executed by the one or more processors, further cause the system to store the video in the at least one memory.

9. The system of claim 1, wherein in providing the user interface, the instructions, when executed by the one or more processors, cause the system to provide the user interface to a device of the user.

10. The system of claim 1, wherein in providing the user interface, the instructions, when executed by the one or more processors, cause the system to provide the user interface to a display screen of the autonomous robot vehicle.

11. A computer-implemented method for a mobile secure locker, the computer-implemented method comprising:
providing a user interface for a user to rent the mobile secure locker in an autonomous robot vehicle;
receiving information through the user interface from the user, the information including a first destination, a second destination, and a time associated with the second destination;
communicating instructions to the autonomous robot vehicle to travel to the first destination to receive an item from the user;

receiving an indication from the autonomous robot vehicle that the item has been received by the autonomous robot vehicle from the user;
communicating instructions to the autonomous robot vehicle to travel to the second destination to deliver the item at the time associated with the second destination;
providing the user interface for the user to enter additional information for retrieving the item from the autonomous robot vehicle, the additional information including a current location of the user, wherein the user interface includes a map that has a user-selectable display of the current location of the user;
modifying the second destination to the current location of the user;
communicating instructions to the autonomous robot vehicle to travel to the current location of the user to deliver the item to the user;
receiving from the autonomous robot vehicle an indication that the item has been retrieved; and
receiving a video from the autonomous robot vehicle, the video recording the user placing the item in the autonomous robot vehicle.

12. The computer-implemented method of claim 11, further comprising storing the video.

13. The computer-implemented method of claim 11, further comprising unlocking the mobile secure locker based on biometric data corresponding to the user.

14. The computer-implemented method of claim 11, further comprising:
providing the user interface to enter user-identifying information identifying the user; and
receiving the user-identifying information through the user interface from the user.

15. A computer-implemented method for a mobile secure locker, the computer-implemented method comprising:
providing a user interface for a user to rent the mobile secure locker in an autonomous robot vehicle;
receiving information through the user interface from the user, the information including a first destination, a second destination, and a time associated with the second destination;
communicating instructions to the autonomous robot vehicle to travel to the first destination to receive an item from the user;
receiving an indication from the autonomous robot vehicle that the item has been received by the autonomous robot vehicle from the user;
communicating instructions to the autonomous robot vehicle to travel to the second destination to deliver the item at the time associated with the second destination;
providing the user interface for the user to enter additional information for retrieving the item from the autonomous robot vehicle, the additional information including a current location of the user, wherein the user interface includes a map that has a user-selectable display of the current location of the user;
receiving the additional information from the user interface, the additional information including the current location of the user;
modifying the second destination to the current location of the user;
communicating instructions to the autonomous robot vehicle to travel to the current location of the user to deliver the item to the user; and
receiving from the autonomous robot vehicle an indication that the item has been retrieved.

16. The computer-implemented method of claim 14, wherein the indication identifying the user includes at least one of a PIN, RFID, voice, facial recognition, or a predetermined code on a mobile device.

17. The computer-implemented method of claim 14, further comprising receiving an indication from the autonomous robot vehicle confirming an identity of the user at the current location of the user, wherein the confirming is performed based on the user-identifying information.

18. The computer-implemented method of claim 11, the method further includes providing the user interface to a device of the user.

19. The computer-implemented method of claim 11, the method further includes providing the user interface to a display screen of the autonomous robot vehicle.

20. The computer-implemented method of claim 12, further comprising:
receiving the additional information from the user interface.

21. The system of claim 3, wherein the instructions, when executed by the one or more processors, further cause the system to:
unlock the mobile secure locker based on biometric data corresponding to the user.

* * * * *